United States Patent
Wielgus et al.

(10) Patent No.: US 7,780,345 B2
(45) Date of Patent: Aug. 24, 2010

(54) METHOD AND APPARATUS FOR A TEMPERATURE SENSOR FOR MEASURING PEAK TEMPERATURES

(75) Inventors: Jerzy Wielgus, Mt. Prospect, IL (US); Daniel R. Gamota, Palatine, IL (US); John B. Szczech, Schaumburg, IL (US); Kin P. Tsui, Morton Grove, IL (US); Jie Zhang, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 426 days.

(21) Appl. No.: 11/959,774

(22) Filed: Dec. 19, 2007

(65) Prior Publication Data

US 2009/0161727 A1 Jun. 25, 2009

(51) Int. Cl.
G01K 3/00 (2006.01)
G01K 7/00 (2006.01)
H01C 7/04 (2006.01)
H01C 7/10 (2006.01)
H01C 3/04 (2006.01)

(52) U.S. Cl. .............. 374/104; 374/183; 374/185; 374/106; 374/112; 29/612; 338/22 R; 338/25

(58) Field of Classification Search ............ 374/104, 374/106, 112, 116, 183, 185, E7.001; 29/612; 338/22 R, 25, 28
See application file for complete search history.

(56) References Cited

U.S. PATENT DOCUMENTS

| 4,469,452 A | 9/1984 | Sharpless et al. |
| 6,957,623 B2 | 10/2005 | Guisinger |
| 2005/0104035 A1 | 5/2005 | Eaddy et al. |
| 2006/0013280 A1 | 1/2006 | Bando et al. |
| 2006/0018361 A1 * | 1/2006 | Hardwicke et al. ............ 338/25 |
| 2006/0274813 A9 | 12/2006 | Chen et al. |

(Continued)

FOREIGN PATENT DOCUMENTS

JP 2007-101503 A 4/2007

(Continued)

OTHER PUBLICATIONS

Chang Ho Lee, "PCT International Search Report with Written Opinion," WIPO, ISA/KR, Korean Intellectual Property Office, Daejeon, Republic of Korea, Feb. 25, 2009.

*Primary Examiner*—Lisa M Caputo
*Assistant Examiner*—Jonathan Dunlap

(57) ABSTRACT

A method and apparatus for an irreversible temperature sensor for measuring a peak exposure temperature. The apparatus is fabricated by printing an admixture of conductive nanoparticles on a dielectric substrate to form a film. The film has an electrical resistance that is inversely proportional to the exposure temperature. The electrical resistance also irreversibly decreases as the exposure temperature of the film increases. A portion of the film is exposed to a pulse of electromagnetic energy sufficient to render it substantially more electrically conductive than the portion that was not exposed. In use, the peak exposure temperature is determined by measuring the electrical resistance of the non-altered portion of the film and the electrical resistance of the portion that was exposed to the pulse of electromagnetic energy, and subtracting the electrical resistance of the altered portion from the electrical resistance of the portion that was not altered, to provide a difference value. The peak exposure temperature is then be calculated as a function of the difference value.

14 Claims, 4 Drawing Sheets

U.S. PATENT DOCUMENTS

2009/0311440 A1 * 12/2009 Li et al. .................. 427/553

FOREIGN PATENT DOCUMENTS

| WO | WO2006021953 | A2 | 3/2003 |
| WO | WO03/034149 | A1 | 4/2003 |
| WO | WO2006048412 | A1 | 5/2006 |
| WO | WO2006071419 | A2 | 7/2006 |

* cited by examiner

METHOD AND APPARATUS FOR A TEMPERATURE SENSOR FOR MEASURING PEAK TEMPERATURES

FIELD OF THE INVENTION

The present invention relates generally to temperature sensors, and more particularly to temperature sensors incorporating nanoparticles, for recording the maximum temperature to which the sensor has been exposed.

BACKGROUND

A significant number of products such as perishable foods, heat sensitive pharmaceuticals, electronics, and volatile chemicals require temperature monitoring during shipment to ensure the product has not been exposed to temperatures beyond a specific threshold that might engender degradation or malfunction of the product. Prior art temperature monitoring devices currently in use include: temperature labels containing visual indicator sections that change color, complex electronic data loggers, thermocouples, and probe thermometers. Among these, even the most cost effective solution (usually less than one dollar per unit) is still too costly for many manufacturers. Two of the most popular types of temperature monitoring solutions include: a liquid crystal (life temperature data) and sealed temperature sensitive chemical indicators which changes color permanently and irreversibly when exposed to elevated temperatures. Unfortunately, these irreversible sensors can only respond to narrow and specific temperature ranges which are usually limited to temperature difference of no more than about 50° Centigrade (C.). Therefore, the common solution for sensing a wide temperature range is accomplished by applying multiple sensors to the product during the shipping cycle, which is even less cost effective. Devices like data loggers or thermocouples are sensitive to much smaller changes and broader ranges, but are an expensive solution that in many cases might exceed the cost of the package being shipped. Therefore, there is a need for a low cost, thin temperature sensor that will register exposure to wide range of temperatures.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
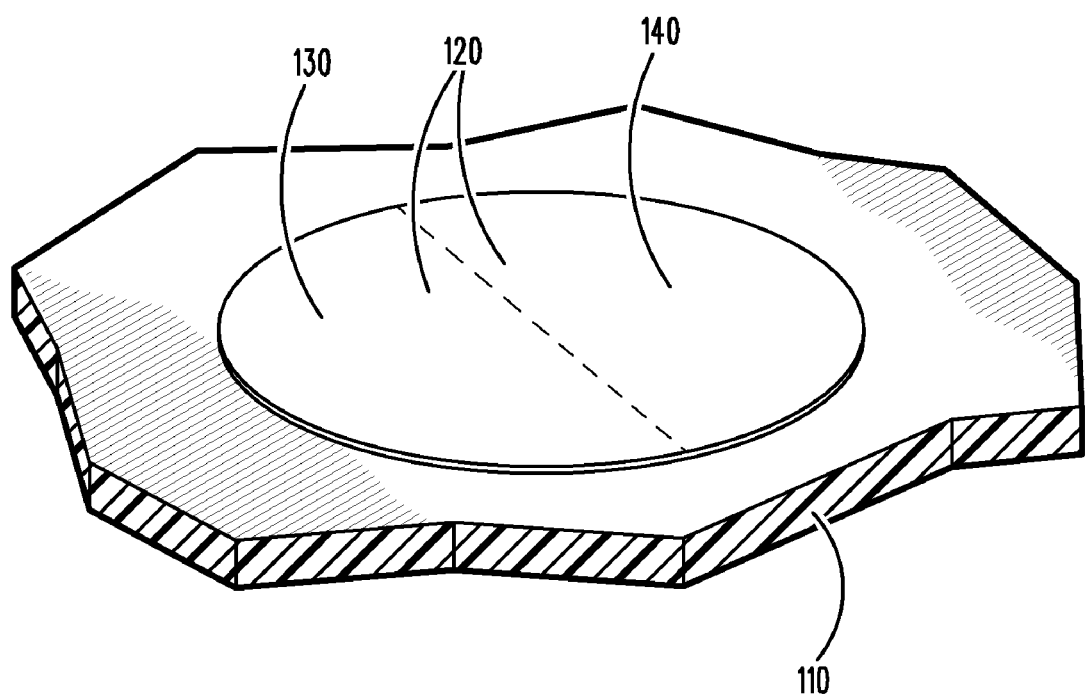
FIG. 1 is an isometric view of a temperature sensor in accordance with some embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method and apparatus components related to a temperature sensor containing nanoparticles. Accordingly, the apparatus components and methods have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

An irreversible temperature sensor for measuring a peak exposure temperature is fabricated by printing an admixture of conductive nanoparticles on a dielectric substrate to form a film. The film has an electrical resistance that is inversely proportional to the exposure temperature. The electrical resistance also irreversibly decreases as the exposure temperature of the film increases. A portion of the film is exposed to a pulse of electromagnetic energy sufficient to render it substantially more electrically conductive than the portion that was not exposed. The peak exposure temperature can then be determined by measuring a) the electrical resistance of the non-altered portion of the film and b) the electrical resistance of the portion that was exposed to the pulse of electromagnetic energy, then subtracting the electrical resistance of the altered portion from the electrical resistance of the portion that was not altered, to provide a difference value. The peak exposure temperature can then be calculated as a function of the difference value.

Referring now to FIG. 1, a dielectric material serves as a substrate 110 that supports the temperature sensor. While the drawing figure depicts a cutaway portion of the substrate, it should be obvious that the size of the substrate is arbitrary and left to the user. It can be large and contain other structure, or it may be small and only contain the sensor. The substrate may comprise any of numerous flexible, non-conductive materials, typically polymers or the equivalent, such as polyesters, polyimides, polyamides, polyamide-imides, polyetherimides, polyacrylates, polysiloxanes, polycarbonates, polyolefins, polymethyl methacrylate, polyvinylidene chloride, fabrics, and paper. Deposited on an upper surface of the substrate 110 is a very thin film 120, typically less than 5 micrometers, that contains nanoparticles. The film 120 is not substantially electrically conductive unless it is cured. A first portion 130 of the film 120 is formed so as to possess an electrical resistance that is inversely proportional to the temperature of the film, the electrical resistance at ambient temperature being greater than the electrical resistance at the peak conductivity temperature and irreversibly decreasing as the temperature increases. In one embodiment, the electrical resistance at ambient temperature of the first portion 130 is five or more orders of magnitude greater than the electrical resistance at the peak conductivity temperature of the first portion. A second portion 140 of the film 120 is more electrically conductive than the first portion 130, the electrical resistance at ambient temperature being equal to or greater than the electrical resistance at the peak conductivity temperature of the second portion, and the electrical resistance of the second portion being less than the electrical resistance of the first portion. In one embodiment, the electrical resistance of the second portion of the film at ambient temperature is equal to or no more than one order of magnitude greater than the electrical resistance at the peak conductivity temperature. In another embodiment, the electrical resistance of the second portion of the film at ambient temperature is two or more orders of magnitude less than the electrical resistance of the first portion.

Figure 2:
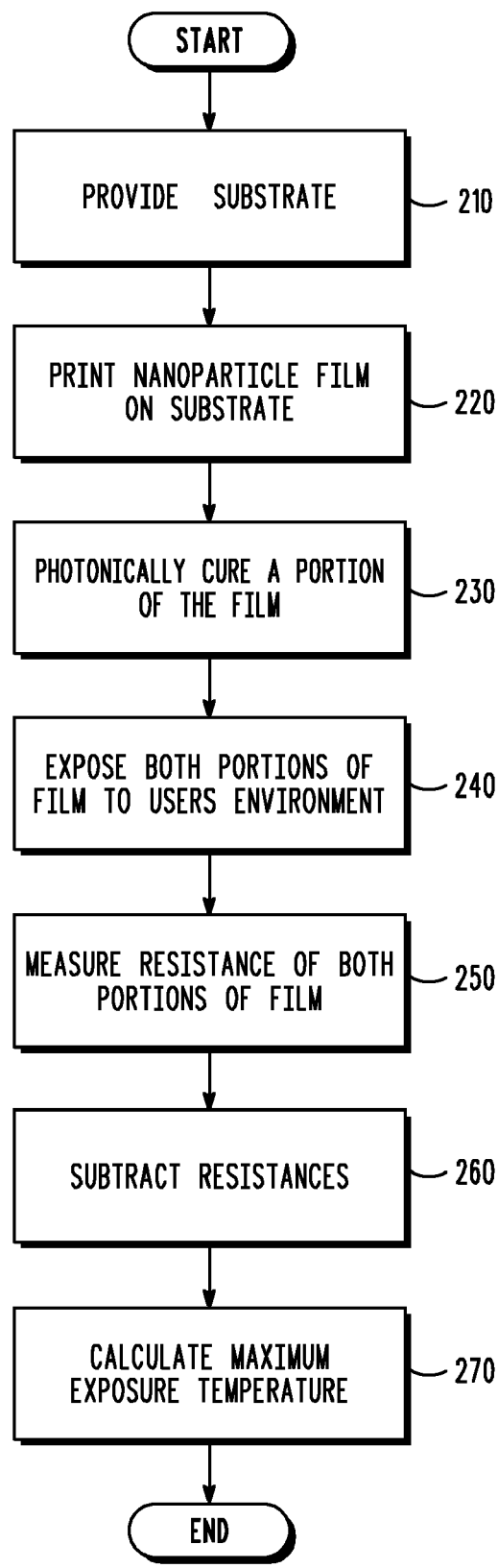
FIG. 2 is a flow chart depicting the process of fabricating a temperature sensor and determining the maximum temperature, in accordance with some embodiments of the invention.

Referring now to FIG. 2, an irreversible temperature sensor for measuring a maximum exposure temperature can be fabricated by beginning 210 with a suitable dielectric substrate. A composition containing electrically conductive nanoparticles is printed 220 on the substrate in conventional manner to form a film that has an electrical resistance that is inversely proportional to temperature. These compositions are known in the printed electronics field as 'electronically functional inks'. Printing the film is accomplished by using traditional graphic arts printing technologies (e.g. gravure, flexography, screen, ink jet) and the printed film is dried, taking care to induce no or minimal cure to the printed film. One or more portions of the printed film are then covered or masked, and the remaining uncovered portions are then exposed 230 to a pulse of electromagnetic energy. The pulse of energy should be sufficiently intense to at least partially cure the exposed portions and render them substantially more electrically conductive than the portion(s) that was/were masked. In one embodiment, the electromagnetic energy is visible light provided by a pulsed xenon source. This type of curing process is known as photonic curing, and is a technology which uses a pulsed light source to rapidly heat and fuse the nanoparticles in the printed composition together without significantly heating the underlying substrate. It takes advantage of the nanoparticle's physical properties such as high surface area to mass ratio, high absorptivity, poor thermal conductivity and low thermal mass. This process allows sintering of the nanoparticles on temperature sensitive substrates that have heat deflection temperature less than or equal to about 150° C. The applied heat induces curing in the printed composition, the amount or degree of cure being a function of both the intensity of the pulse of light and the chemistry of the materials in the printed composition. Curing is a time/temperature phenomenon, and as the printed composition cures, the electrical conductivity increases as a direct function of the degree of cure. When the composition is completely cured, the electrical conductivity of the material is at a maximum, and additional heating will not alter the conductivity. This level of cure is known as the 'peak conductivity'. It should be obvious to a reader of ordinary skill in the art that different compositions having, for example, differing amounts of nanoparticles, different types of nanoparticles, different binding polymers, etc. can each have unique values of peak conductivity. For example, printed composition X might have a peak conductivity of 150° C., whereas printed composition Y might have a peak conductivity of 120° C., and printed composition Z might have a peak conductivity of 100° C. In a preferred embodiment, the pulse of electromagnetic energy is sufficient to take the printed composition completely to or close to the peak conductivity temperature.

Since those portions 140 that were exposed 230 to the pulse of light are now cured to their peak conductivity, they will serve as a reference, because the resistance will not change with further thermal treatment. The curing process has rendered them more thermally stable than the unexposed portions 130. The masked area 130 remains generally uncured/unsintered, generating a highly resistive, poorly-conducting film, that becomes more conductive as it is exposed to thermal excursions from the environment. The irreversible temperature sensing apparatus, comprising the substrate 110 and the two portions 130, 140 of the printed film 120, are now attached to a specimen or workpiece of interest, and when the workpiece and the attached irreversible temperature sensing apparatus are exposed to elevated temperatures 240, the unexposed portion 140 of the film will undergo a degree of cure that is a function of the exposure temperature. The maximum exposure temperature can be calculated at a later time by measuring the resistance 250 of both portions 130, 140 of the printed nanoparticle film, and subtracting the electrical resistance 260 of the photonically altered portion from the electrical resistance of the portion that was not photonically altered, so as to provide a difference value. The peak exposure temperature can then be calculated 270 as a function of the difference value.

Figure 3:
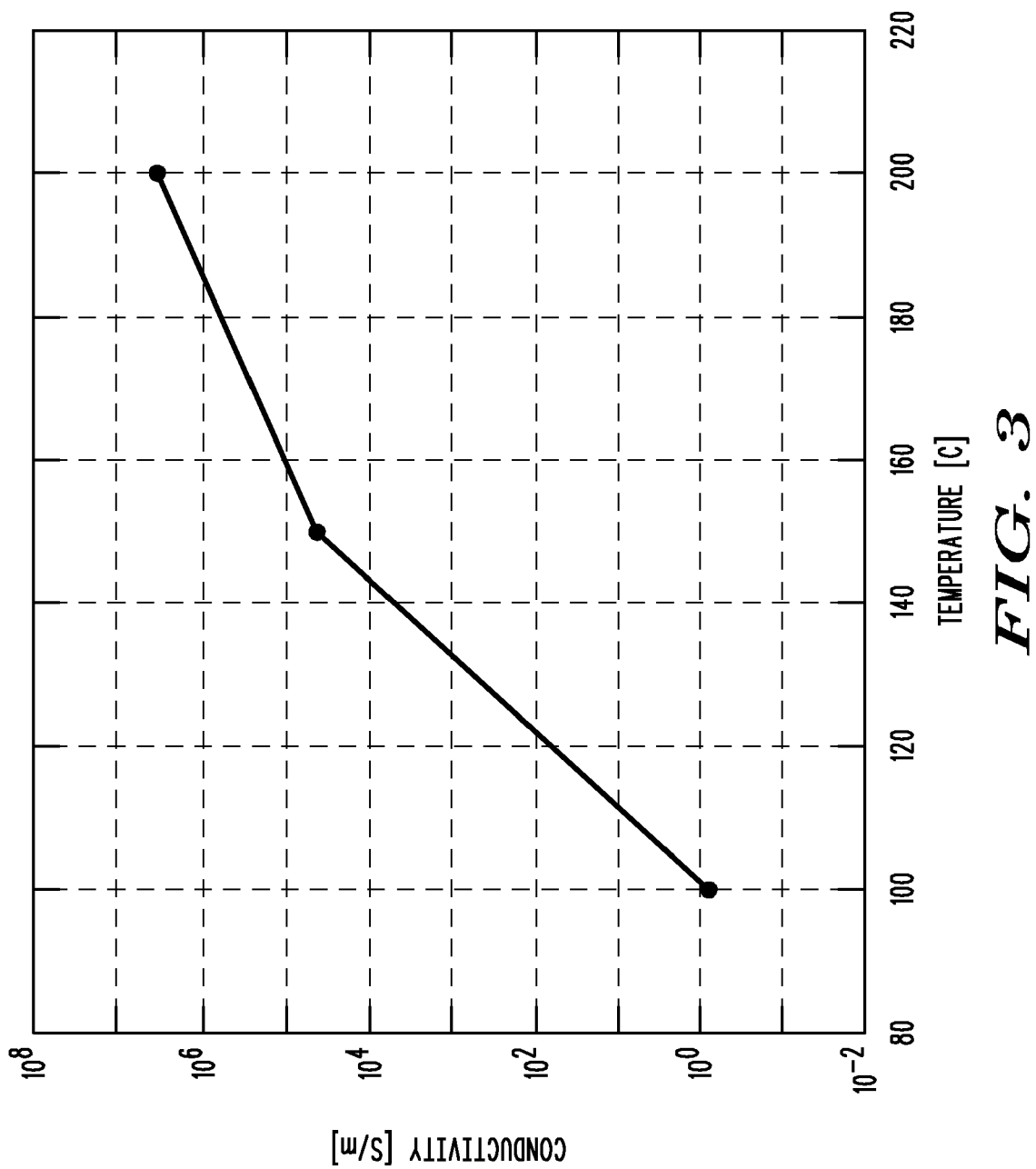
FIG. 3 is a graph of electrical conductivity vs. processing temperature of one example of a printed composition in accordance with some embodiments of the invention.
Figure 4:
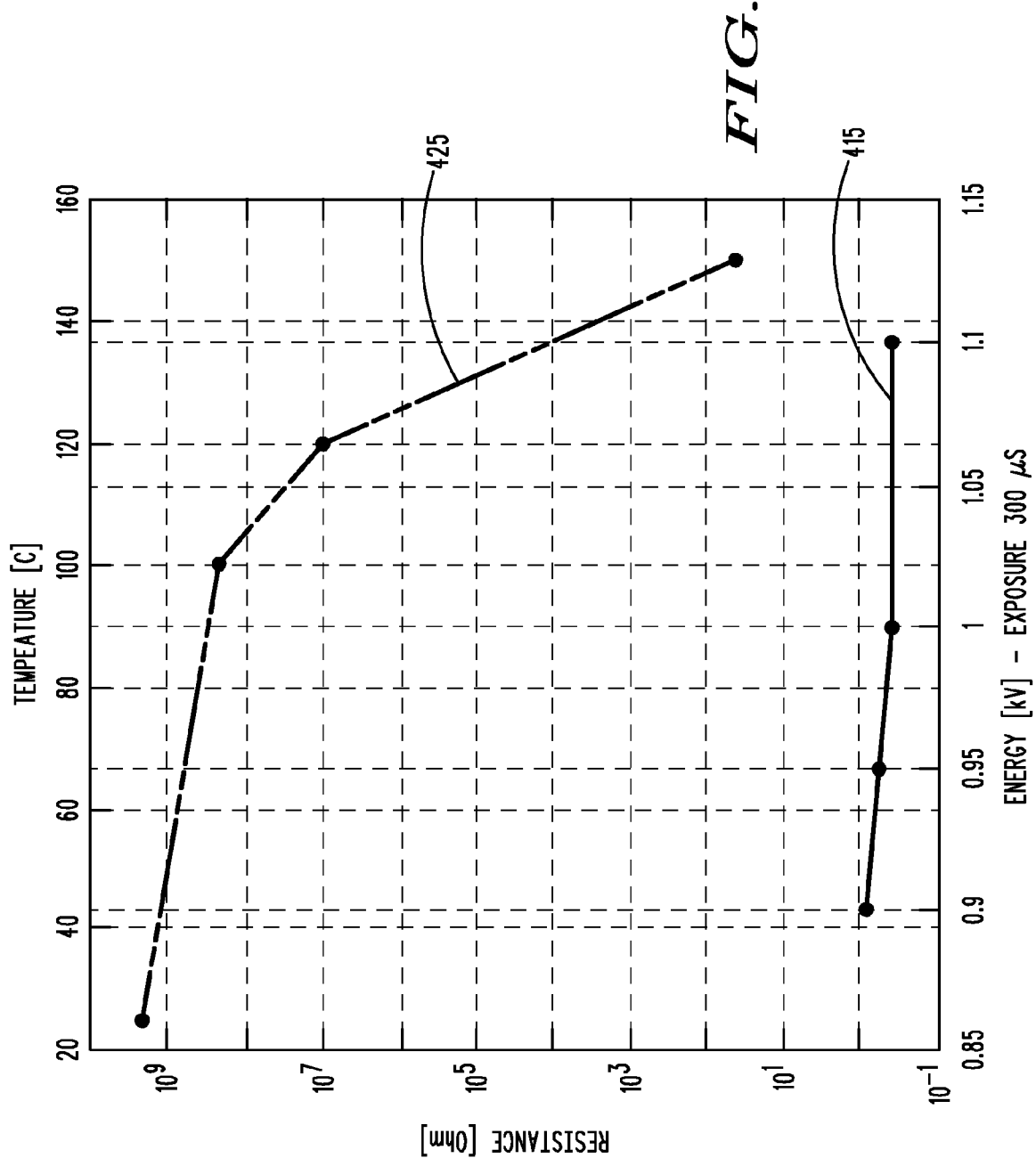
FIG. 4 is a graph of electrical resistance vs. temperature for the printed composition of FIG. 3, in accordance with some embodiments of the invention.

Referring now to FIG. 3, a graph of conductivity vs. processing temperatures for one ink of interest, one can determine by inspection that the ink is relatively non-conductive, and becomes increasingly more conductive as the processing temperature is increased by photonic curing. For example, at 150° C., the ink is cured to an extent that the conductivity is approximately $5 \times 10^4$ siemens/meter (s/m), whereas a processing temperature of 200° C. cures the ink to yield a conductivity of approximately $5 \times 10^6$ siemens/meter. Those skilled in the art will appreciate that the shape of the curve indicates that a peak conductivity will be obtained when the ink is completely cured. Referring now to FIG. 4, a graph of resistance vs. exposure temperature, the lower curve 415 represents the portion 140 of the film that was initially exposed to the electromagnetic energy pulse, causing it to be cured at or close to the level of peak conductivity, and the resistance of this portion remains relatively constant over additional thermal treatment or exposure, varying by less than one order of magnitude. In contrast, the upper curve 425 represents the portion 130 of the film that was masked and did not undergo curing during the electromagnetic energy pulse. The resistance is initially over 8 orders of magnitude higher than the exposed portion, but as this portion of the film is exposed to thermal treatment from the environment, the material cures, causing the resistance to drop. One can see that by measuring the difference between the resistance of the lower curve 415 and the upper curve 425 at any point, one can then derive the exposure temperature using this calibration curve. Thus, at a later time, when the sensor is being used to monitor and record a maximum exposure temperature during use, the exposure temperature will cause only the masked, or uncured, portions to change resistance. The conductive and non-conductive film creates a temperature sensing device which uses conductivity gradient to monitor temperature through variation in electrical conductivity.

In summary, the invention provides a simple, low cost, solution to produce small, cost effective temperature sensors. It takes advantage of the physical nature of nanomaterials and photonic cure technology to create a conductivity gradient that can be used to calculate the change in temperature.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An irreversible temperature sensor for measuring a peak exposure temperature, comprising:
   a dielectric substrate;
   a film comprising electrically conductive nanoparticles printed on the dielectric substrate;
   a first portion of the film having an electrical resistance that is inversely proportional to the temperature of the film and irreversibly decreasing as the temperature increases;
   a second portion of the film having an electrical resistance that is inversely proportional to the temperature of the film; and
   the second portion of the film having a state of cure that is greater than the first portion, such that the electrical resistance of the second portion is less than the electrical resistance of the first portion, wherein the peak exposure temperature is a function of the difference obtained by subtracting the electrical resistance of the second portion from the electrical resistance of the first portion.

2. The irreversible temperature sensor as described in claim 1, wherein the dielectric substrate comprises a substrate selected from the group consisting of polyesters, polyimides, polyamides, polyamide-imides, polyetherimides, polyacrylates, polysiloxanes, polycarbonates, polyolefins, polymethyl methacrylate, polyvinylidene chloride, fabrics, and paper.

3. The irreversible temperature sensor as described in claim 1, wherein the electrical resistance of the first portion of the film at ambient temperature is five or more orders of magnitude greater than the electrical resistance at the peak conductivity temperature of the first portion.

4. The irreversible temperature sensor as described in claim 1, wherein the electrical resistance of the second portion of the film at ambient temperature is equal to or no more than one order of magnitude greater than the electrical resistance at the peak conductivity temperature of the second portion.

5. The irreversible temperature sensor as described in claim 1, wherein the electrical resistance of the second portion of the film at ambient temperature is two or more orders of magnitude less than the electrical resistance of the first portion.

6. The irreversible temperature sensor as described in claim 1, wherein the electrical resistance of the second portion of the film at ambient temperature is equal to or no more than one order of magnitude greater than the electrical resistance at the peak conductivity temperature of the second portion and two or more orders of magnitude less than the electrical resistance of the first portion.

7. The irreversible temperature sensor as described in claim 1, wherein the electrical resistance of the first portion of the film at ambient temperature is five or more orders of magnitude greater than the electrical resistance at the peak conductivity temperature of the first portion, and the electrical resistance of the second portion of the film at ambient temperature is equal to or no more than one order of magnitude greater than the electrical resistance at the peak conductivity temperature of the second portion and two or more orders of magnitude less than the electrical resistance of the first portion.

8. A method of making an irreversible temperature sensor for measuring a peak exposure temperature, comprising:
   providing a dielectric substrate;
   printing an admixture comprising electrically conductive nanoparticles on the dielectric substrate to form a film having an electrical resistance that is inversely proportional to the exposure temperature, the electrical resistance irreversibly decreasing as the exposure temperature of the film increases; and
   photonically altering only a portion of the film by exposure to a pulse of electromagnetic energy sufficient to render the photonically altered portion substantially more electrically conductive than the portion that was not photonically altered, wherein the electrical resistance at ambient temperature is equal to or greater than the electrical resistance at the peak conductivity temperature of the portion, wherein the peak exposure temperature is a function of the difference obtained by subtracting the electrical resistance of the photonically altered portion from the electrical resistance of the portion that was not photonically altered.

9. The method as described in claim 8, wherein printing an admixture comprises forming a film having an electrical resistance at ambient temperature that is five or more orders of magnitude greater than the electrical resistance at the peak conductivity temperature of the film.

10. The method as described in claim 8, wherein photonically altering comprises exposure to a pulse sufficient to render the photonically altered portion at least two orders of magnitude more electrically conductive than the portion that was not photonically altered.

11. The method as described in claim 8, wherein photonically altering comprises exposure to a pulse sufficient to render the electrical resistance at ambient temperature of the photonically altered portion to be equal to or no more than one order of magnitude greater than the electrical resistance at the peak conductivity temperature.

12. The method as described in claim 8, wherein photonically altering comprises exposure to a pulse sufficient to render the photonically altered portion at least two orders of magnitude more electrically conductive than the portion that was not photonically altered and equal to or no more than one order of magnitude greater than the electrical resistance at the peak conductivity temperature.

13. The method as described in claim 8, wherein photonically altering comprises exposure to a pulse of electromagnetic energy from a xenon lamp.

14. A method of measuring a peak exposure temperature using an irreversible temperature sensor having conductive nanoparticles, comprising:

measuring the electrical resistance of a conductive nanoparticle film having an electrical resistance that is inversely proportional to the exposure temperature, the electrical resistance at ambient temperature being greater than the electrical resistance at the peak conductivity temperature and irreversibly decreasing as the exposure temperature of the film increases;

measuring the electrical resistance of a photonically altered portion of the conductive nanoparticle film having an electrical conductivity substantially greater than the portion that was not photonically altered and an electrical resistance at ambient temperature equal to or greater than an electrical resistance at the peak conductivity temperature;

subtracting the electrical resistance of the photonically altered portion from the electrical resistance of the portion that was not photonically altered, so as to provide a difference value; and calculating the peak exposure temperature as a function of the difference value.

* * * * *